United States Patent
Gross et al.

(10) Patent No.: US 11,909,194 B2
(45) Date of Patent: Feb. 20, 2024

(54) DIFFERENTIAL PROTECTION DEVICE AND PROTECTION SYSTEM FOR MONITORING OBJECTS TO BE PROTECTED IN A POWER SUPPLY NETWORK

(71) Applicant: Siemens Akiengesellschaft, Munich (DE)

(72) Inventors: Matthias Gross, Berlin (DE); Torsten Kerger, Schoenwalde-Glien (DE); Sven Krueger-Gramatte, Berlin (DE); Robert Matussek, Berlin (DE); Andreas Regenbrecht, Berlin (DE); Torsten Schumacher, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 17/701,900

(22) Filed: Mar. 23, 2022

(65) Prior Publication Data
US 2022/0311232 A1    Sep. 29, 2022

(30) Foreign Application Priority Data

Mar. 23, 2021  (EP) .................................... 21164237

(51) Int. Cl.
*H02H 3/00* (2006.01)
*H02H 1/00* (2006.01)

(52) U.S. Cl.
CPC ............ *H02H 3/00* (2013.01); *H02H 1/0007* (2013.01)

(58) Field of Classification Search
CPC ...... H02H 3/30; H02H 1/0007; H02H 1/0061; H02H 3/00; H02H 3/305; H02H 7/262;
(Continued)

(56) References Cited

U.S. PATENT DOCUMENTS 8,154,836 B2    4/2012  Kasztenny et al.
10,429,429 B2 * 10/2019 Kerger ............... G01R 19/2513
(Continued)

FOREIGN PATENT DOCUMENTS

| EP | 2605353 A2 * | 6/2013 | ............... H02H 3/40 |
| EP | 3036808 B1 * | 3/2022 | ............ H02H 3/305 |
| WO | WO 2015036007 A1 | 3/2015 | |

*Primary Examiner* — Jared Fureman
*Assistant Examiner* — Nicolas Bellido
(74) *Attorney, Agent, or Firm* — Laurence A. Greenberg; Werner H. Stemer; Ralph E. Locher (57) ABSTRACT

A differential protection device monitors a first object to be protected in an electrical energy supply network. The differential protection device has a measuring unit configured to acquire measurement values at one end of the first object to be protected, a communication unit configured to exchange measurement values with a differential protection device arranged at another end of the first object to be protected, the communication unit has a physical interface for transmitting and receiving the measurement values, and an evaluation unit configured to form a differential value and to generate a fault signal indicating a fault with regard to the first object to be protected if the differential value exceeds a predefined threshold value. Ideally, the differential protection device is configured to monitor further objects to be protected and to exchange respective further measurement values with regard to each further object to be protected.

9 Claims, 4 Drawing Sheets

(58) Field of Classification Search
CPC ...... H02H 7/265; H04J 3/0667; H04J 3/0661; G01R 31/085; G01R 31/086; G01R 31/58; H04B 1/0042; H04B 17/20
See application file for complete search history.

(56) References Cited

U.S. PATENT DOCUMENTS

| | | | |
|---|---|---|---|
| 11,588,319 B2* | 2/2023 | Kerger | G01R 31/085 |
| 2010/0153036 A1* | 6/2010 | Elwarry | G01R 21/133 |
| | | | 702/62 |
| 2010/0191386 A1* | 7/2010 | Sezi | H02H 3/28 |
| | | | 706/12 |
| 2010/0202092 A1* | 8/2010 | Gajic | H02H 3/305 |
| | | | 361/87 |
| 2011/0255202 A1 | 10/2011 | Hartmann | |
| 2014/0344559 A1* | 11/2014 | Morita | G06F 9/4413 |
| | | | 713/1 |
| 2017/0059636 A1* | 3/2017 | Kerger | H02H 7/263 |
| 2019/0120892 A1 | 4/2019 | Dzienis et al. | |
| 2021/0273442 A1* | 9/2021 | Kerger | H02H 1/0007 |

* cited by examiner

DIFFERENTIAL PROTECTION DEVICE AND PROTECTION SYSTEM FOR MONITORING OBJECTS TO BE PROTECTED IN A POWER SUPPLY NETWORK

CROSS-REFERENCE TO RELATED APPLICATION

This application claims the priority, under 35 U.S.C. § 119, of European Patent Application EP 21164237.6, filed Mar. 23, 2021; the prior application is herewith incorporated by reference in its entirety.

FIELD AND BACKGROUND OF THE INVENTION

The invention relates to a differential protection device for monitoring a first object to be protected in an electrical energy supply network. The differential protection device has a measuring unit configured to acquire measurement values (e.g. current measurement values or charge measurement values) at one end of the first object to be protected. The measurement values indicating the current flowing at the end. The differential protection device further has a communication unit configured to exchange measurement values with a differential protection device arranged at another end of the first object to be protected. The communication unit has a physical interface for transmitting and receiving the measurement values, and an evaluation unit designed to form a differential value with mutually assigned measurement values from both ends of the first object to be protected and to generate a fault signal indicating a fault with regard to the first object to be protected if the differential value exceeds a predefined threshold value.

The invention also relates to a protection system containing such a differential protection device.

For monitoring objects to be protected in electrical energy supply networks (e.g. high- and medium-voltage lines in the form of overhead lines or cables, transformers or busbars), use is often made of a differential protection method (referred to hereinafter for simplicity as "differential protection method"). In this context, the current flowing in each case at the ends of the monitored object to be protected or a flowing charge is detected and fed to a differential protection device. From the resulting measurement values, the differential protection device forms differential values that are used for assessing the operating situation of the primary component monitored. In the fault-free case, according to Kirchhoff's current law, the differential values lie in a range close to zero since in this case—in simplified terms—the current or charge flowing into the component also flows completely out of it again. This also holds true in the case of load currents flowing through the monitored line or in the case of external faults, i.e. faults which are outside the monitored line and the fault currents of which flow through the line. By contrast, if differential values arise which exceed a threshold value different than zero, then they allow a faulty operating state, e.g. an internal short circuit, to be deduced. In this case, the fault current present has to be interrupted by the opening of switching units, e.g. circuit breakers, delimiting the object to be protected. For this purpose, the differential protection device generates a corresponding fault signal that can be used for generating a switching signal for the respective switching unit.

In practice, in the case of differential protection systems, influences that result in apparent differential current values not equal to zero can occur even during fault-free operation. Such influences may be for example measurement inaccuracies, saturation phenomena of current transformers, capacitive charging currents or asynchronous communication via a communication connection. For this reason, a response value of zero cannot be assumed for the assessment of the differential values.

In the context of the differential protection method, the measurement values often have to be transferred via a relatively long path. In such a case, it is customary for a separate differential protection device to be arranged at each end of the object to be protected, the differential protection device forming the differential value from its own (locally acquired) measurement values and the measurement values received from the other end of the object to be protected. In the case of an object to be protected which has a plurality of ends, e.g. a branched line, measurement values from each of the ends are required, moreover, in order to be able to carry out the differential protection method correctly. For this purpose, the measurement values acquired locally at the respective measuring locations have to be transferred between the individual differential protection devices.

Assessing the operating situation of an object to be protected thus requires measurement values from at least two different measuring locations at the respective ends of the monitored object to be protected. In this case, the measurement values can be augmented by further information, such as control and/or supervisory data. In existing differential protection systems, the measurement values are often transferred via a hardwired point-to-point connection (e.g. copper or fiber-optic lines), whereby a deterministic transfer is achieved, that is to say that the transfer time of the measurement values is principally dependent on the transfer path and the mode of transfer and is also substantially constant.

Figure 1:
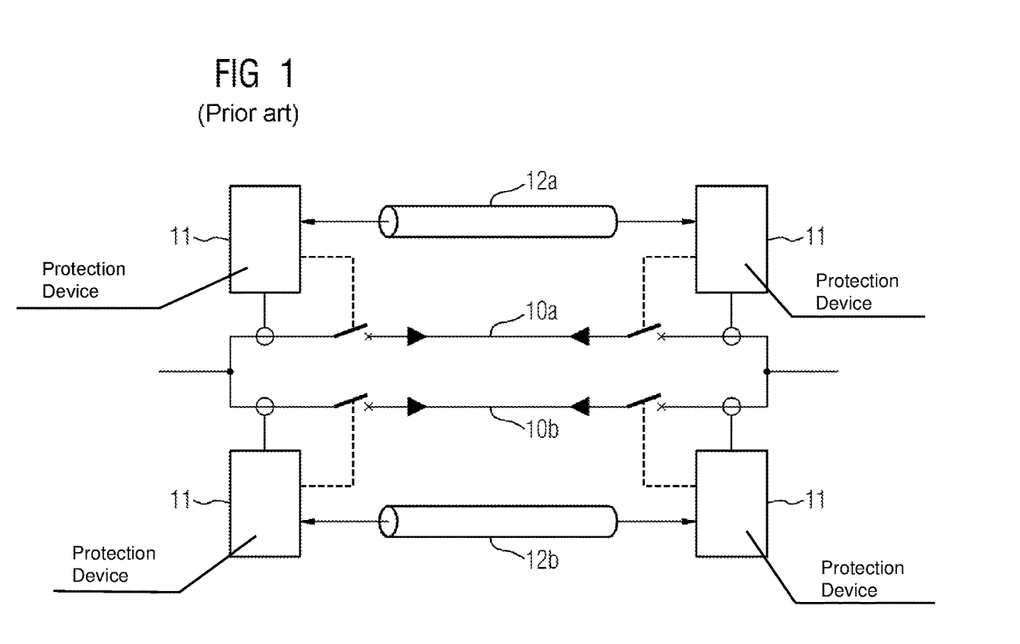
FIG. 1 is a diagrammatic block diagram showing a first exemplary embodiment of a protection system according to the prior art.
Figure 2:
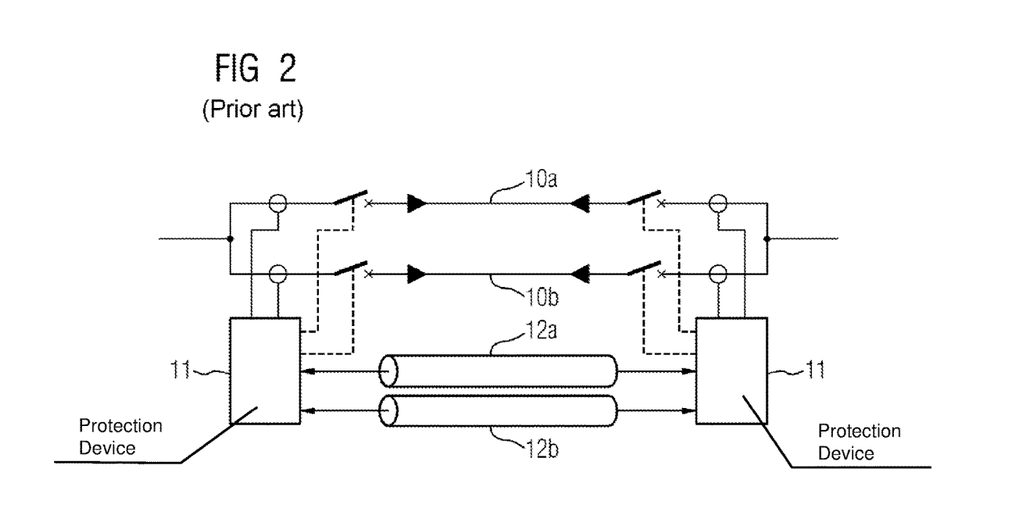
FIG. 2 is a diagrammatic block diagram showing a second exemplary embodiment of a protection system according to the prior art.

It is thus evident that a dedicated transfer path for transferring the measurement values is kept available for each object to be protected that is monitored by a differential protection device, for which purpose the differential protection device has to provide in each case a suitable physical communication interface (e.g. a serial interface or an optical or electrical ethernet interface). Examples of the construction of known protection systems containing differential protection devices are illustrated in FIGS. 1 and 2. FIG. 1 shows two objects to be protected 10a, 10b—running parallel to one another—in the form of lines of an energy supply network, which are monitored for faults by means of differential protection devices 11. For this purpose, a respective differential protection device 11 is provided at each end of the two objects to be protected 10a, 10b and captures measurement values, e.g. current measurement values. For exchanging the captured measurement values, transfer paths 12a, 12b are provided between two differential protection devices 11 in each case. Each differential protection device 11 has a physical communication interface, via which the measurement values are coupled into or received from a transfer medium, e.g. a copper line or a fiber-optic cable. In the fault situation, switching units are caused to interrupt the fault current. FIG. 2 shows an alternative protection system, in which the monitoring is effected by only two differential protection devices 11. In this case, each differential protection device 11 is embodied for monitoring two objects to be protected 10a, 10b in the form of lines and can correspondingly acquire measurement values at both objects to be protected 10a, 10b. Use is likewise made of two transfer paths 12a, 12b for transferring the measurement values, such that each differential protection device 11 correspondingly has two physical interfaces.

SUMMARY OF THE INVENTION

The number of objects to be protected which can be monitored by a differential protection device is thus reflected in the number of physical communication interfaces in a ratio of 1:1 and has to be taken into account in the planning and construction of a protection system. Among those skilled in the art it has hitherto been regarded as an advantage to keep available for each object to be protected a dedicated transfer path including the corresponding physical communication interfaces, since the risk of a communication failure is thus restricted only to one object to be protected. A further aspect of the prior art is the measurement of the path difference between the clocks of two differential protection devices via the dedicated transfer path. The total transfer time is likewise an important criterion for a differential protection system, since the command time required to switch the circuit breaker is formed in part from the propagation time of the measurement values between the differential protection devices. The previously realized transfer rates of e.g. 64 kbit/s require dedicated transfer paths.

In the past, despite a high expenditure in respect of material and costs, these aspects have been factors in favor of providing a dedicated transfer path between the differential protection devices for each object to be protected.

U.S. Pat. No. 8,154,836 B2 discloses a differential protection method in which a dedicated transfer path is used in a differential protection system with more than two ends for each monitored object to be protected.

Proceeding from a differential protection device of the type mentioned in the introduction, the invention is based on the object of reducing complexity and costs for the construction of a protection system for a plurality of objects to be protected.

In order to achieve this object, a differential protection device is proposed which is configured to monitor at least one further object to be protected at the same time as the first object to be protected and to exchange respective further measurement values with regard to each further object to be protected, wherein all the measurement values are transmitted and received via the same physical communication interface (also referred to hereinafter for short as "physical interface").

The solution according to the invention is thus based first on overcoming the prejudice among those skilled in the art according to which a dedicated transfer path has to be made available for each object to be protected. According to the invention, the differential protection device thus has only one physical communication interface, via which the measurement values of all the objects to be protected are transferred. The number of transfer paths to be provided is thus reduced to one, which is accordingly used for a plurality of objects to be protected, with the result that complexity and costs for a protection system containing such differential protection devices can accordingly be reduced.

In accordance with one advantageous embodiment of the protection device according to the invention, provision can be made for mapping at least two logical communication interfaces (also referred to hereinafter for short as "logical interfaces") onto the physical interface, wherein for each monitored object to be protected a dedicated logical interface is provided, via which the measurement values related to the respective monitored object to be protected are exchanged.

In accordance with this embodiment, the provision of physical interfaces that is known from the prior art is thus replaced by the provision of corresponding logical interfaces. In this context, a logical interface should be understood to mean as it were an interface which is set up separately via a physical interface and serves for coupling to a logical transfer channel, wherein according to the communication protocol used a separate data connection between the transmitting device and the receiving device is defined via the logical interface. By way of example, for this purpose, each logical interface can be assigned a dedicated logical address (e.g. a MAC address (Media Access Control) or a specific device address) of the differential protection device. Consequently, when two differential protection devices according to the invention are connected, a communication connection arises which, at the physical level, consists of a physical transfer path which is connected to each of the differential protection devices via a respective physical interface. At the logical level, a plurality of logical interfaces are provided by each physical interface. A plurality of logical transfer channels are correspondingly formed on the physical transfer path, wherein each logical transfer channel is embodied between two logical interfaces of the differential protection devices involved. The number of logical interfaces corresponds to the number of monitored objects to be protected, such that a dedicated logical transfer channel is provided for each object to be protected.

Owing to the availability of specialized hardware, e.g. in the form of ASICs or FPGAs, at low costs, a sufficiently rapid data transfer is made possible even in the case of physical interfaces embodied with a plurality of logical interfaces.

In concrete terms, provision can be made for the measuring unit to acquire the measurement values in the form of current phasors indicating the amplitude and phase angle of the currents flowing at the end of the respective line.

With the use of current phasors, the differential values are usually determined by vectorial addition and subsequent absolute value formation from current phasor measurement values associated with one another.

A further advantageous embodiment of the differential protection device according to the invention provides for the measuring unit to have a local timer and to assign to the measurement values in each case a time stamp indicating the point in time when they were acquired.

The timer can be integrated into the physical interface, for example, which can be realized advantageously in particular when the physical interface is embodied in the form of an FPGA or ASIC. However, a separate embodiment is also possible.

In accordance with a further advantageous embodiment of the differential protection device according to the invention, provision can be made for the differential protection device to be configured automatically to recognize other differential protection devices connected to it via the communication connection and to assign the respective associated differential protection device to each monitored object to be protected.

In this way, a simple configuration of the communication connections can be made possible particularly in the case of protection systems with a multiplicity of objects to be protected. Knowledge of the other differential protection devices present is necessary for this. With automatic recognition of the differential protection devices and corresponding assignment to the respective objects to be protected, it is possible to avoid a high manual effort for the configuration.

In concrete terms, in this context, provision can be made for the differential protection device to be configured, when a connection to another differential protection device is established, to exchange identification data enabling an assignment of the respective differential protection device to a respective monitored object to be protected.

Such identification data can be exchanged for example when the protection system is started up. Besides an identification of the respective differential protection device, the data additionally comprise an indication regarding which object to be protected or which objects to be protected the differential protection device is assigned.

Besides that or additionally, in this context, provision can be made for the differential protection device to be designed to perform the automatic recognition and/or assignment of another differential protection device on the basis of a configuration file formed in accordance with the standard IEC 61850.

The standard IEC 61850 constitutes a standard established in the field of automation of energy supply networks; besides comprehensive data modelling, the standard regulates the type of communication between individual devices. For this purpose, configuration files are defined which include indications about individual devices (ICD—Intelligent electronic device configuration description) and/or an entire installation (SCD—Substation configuration description). Such configuration files thus enable the identification of individual differential protection devices and their assignment to respective objects to be protected.

The object mentioned above is also achieved by means of a protection system for monitoring at least two objects to be protected in an energy supply network with at least two differential protection devices, of which at least one differential protection device is embodied as claimed in any of the differential protection device claims. Depending on the topology and arrangement of the monitored objects to be protected, it may be necessary to use one or more correspondingly embodied differential protection devices. In this case, such differential protection devices that monitor only one object to be protected can be embodied in a conventional manner since they are linked to only one transfer path anyway.

In concrete terms, provision can be made here for the protection system to be embodied for monitoring at least two objects to be protected which are arranged parallel to one another, wherein a respective differential protection device as claimed in any of claims 1-7 is arranged at the respective ends of the two parallel objects to be protected.

All explanations given above and below concerning the differential protection device according to the invention are applicable with regard to the protection system according to the invention, and vice versa, mutatis mutandis. With regard, too, to the advantages of the protection system according to the invention, reference is made to the advantages described concerning the differential protection device according to the invention.

Such topologies often occur in the context of the monitoring of parallel lines in an energy transmission network. In this case, per line end one differential protection device for monitoring both lines becomes necessary. The two differential protection devices are connected to one another via a single physical transfer path and, therefore, in this regard, each have only one corresponding physical interface.

In this case, it is possible for more than two objects to be protected to be arranged parallel to one another and for the differential protection devices correspondingly to simultaneously monitor more than two objects to be protected. Moreover, a protection system can comprise a plurality of such parallel structures, at each of the ends of which a corresponding differential protection device is arranged.

Another advantageous embodiment of the protection system according to the invention provides, finally, for the protection system to be embodied for monitoring at least two objects to be protected which adjoin one another, wherein a differential protection device as claimed in any of the differential protection device claims is arranged at those ends of the two mutually adjoining objects to be protected.

In this embodiment, at least one of the differential protection devices thus performs the monitoring of two objects to be protected, e.g. two lines adjacent to one another, and can thus realize two transfer paths via a single physical interface.

In this embodiment, too, there is the possibility for more than two objects to be protected to adjoin one another and for correspondingly more than two objects to be protected to be monitored by one differential protection device. A combination of a topology with mutually adjoining and parallel-extending objects to be protected is also possible.

The invention is explained in greater detail below on the basis of an exemplary embodiment. The specific configuration of the exemplary embodiment should in no way be understood as restrictive for the general configuration of the differential protection device according to the invention or of the protection system according to the invention; rather, individual configuration features of the exemplary embodiment can be combined arbitrarily freely among one another and with the features described above.

Other features which are considered as characteristic for the invention are set forth in the appended claims.

Although the invention is illustrated and described herein as embodied in a differential protection device and a protection system for monitoring objects to be protected in a power supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

First, the principles of differential protection will be discussed generally. Referring now to the figures of the drawings in detail and first, particularly to FIG. 3 thereof, there is shown a part 30 of an electrical energy supply network, more specific details of this network not being illustrated hereinafter. The part 30 contains an object to be protected in the form of a three-phase line 31, which can be embodied for example as an overhead line or as a cable. The line 31 is monitored at its first end 31a by means of a first differential protection device 32a and at its second end 31b by means of a second differential protection device 32b with regard to faults occurring on the line, e.g. short circuits. For this purpose, for each phase 33a-33c of the line 31 with first current transformers 34a-34c at a first measuring location at the first end 31a of the line 31 and second current transformers 35a-35c at a second measuring location at the second end 31b of the line 31, current signals are acquired and fed to a respective measuring unit of the differential protection devices 32a, 32b. For example current phasor measurement values are generated from the analog current signals and give an indication of amplitude and phase angle of the current signal at the point in time of acquisition. The generation of the current phasor measurement values including an A/D conversion can be effected in the measuring unit of the respective differential protection device 32a, 32b, in the current transformers themselves or in a suitable interposed measuring device (not illustrated in FIG. 3), e.g. a phasor measurement unit (PMU), a remote terminal unit (RTU) or a merging unit. Ultimately the current phasor measurement values generated are fed to an evaluation unit, e.g. a CPU and/or a signal processor, of the respective differential protection device 32a, 32b.

Figure 3:
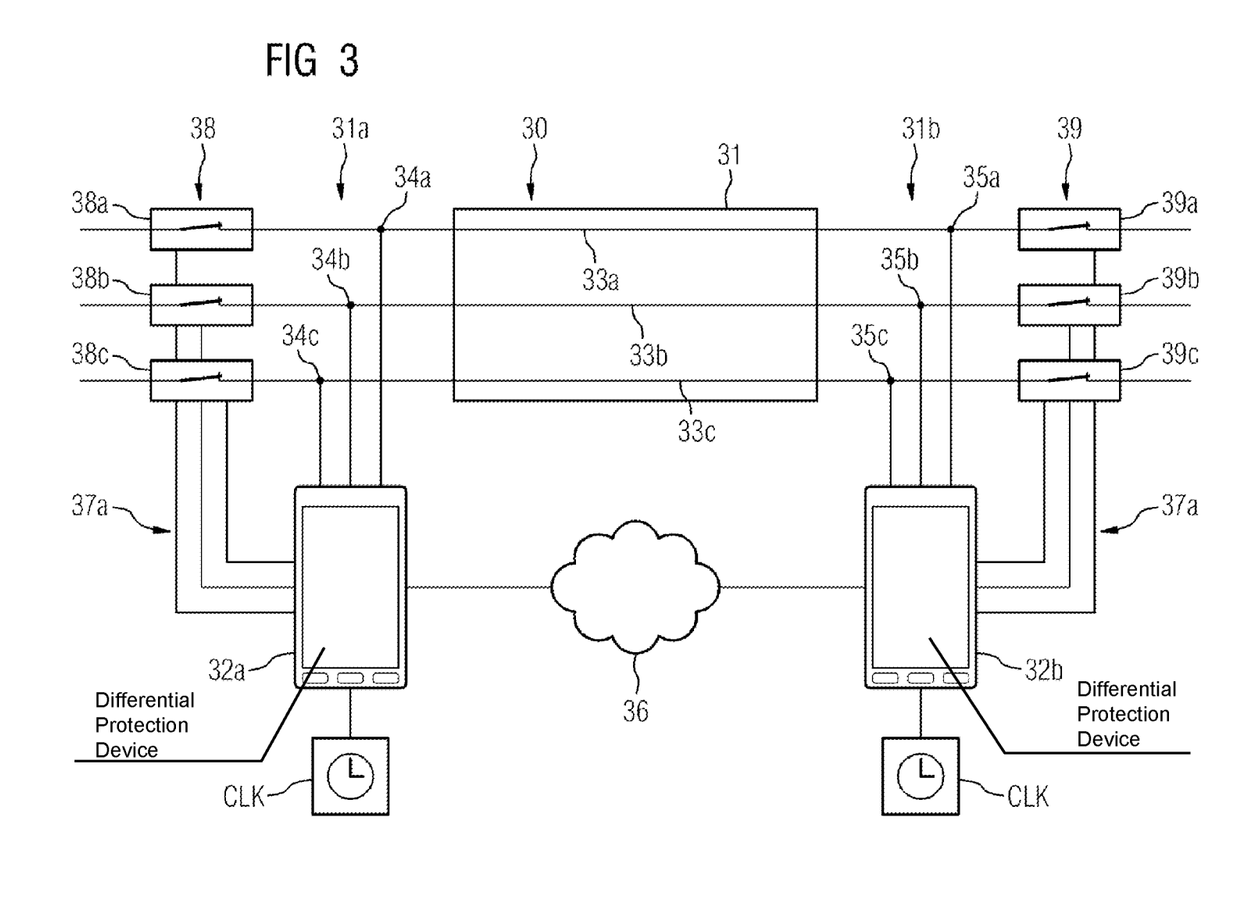
FIG. 3 is a diagrammatic block diagram showing a protection system for the general elucidation of a differential protection method.

The differential protection devices 32a and respectively 32b are connected to one another by a communication connection 36, which is merely indicated schematically in FIG. 3 and which can be e.g. a copper cable line, a fiber-optic line, an IP-based communication network or a telecommunication network. However, any further communication connection of arbitrary type can also be used for connecting the differential protection devices 32a and 32b. Via this communication connection 36, the current phasor measurement values from the respective other end 31a, 31b of the line 31 can be made available to the respective differential protection device 32a or 32b, that is to say that in each differential protection device 32a and respectively 32b for each phase 33a, 33b, 33c of the line 31 it is possible to form in each case pairs of current phasor measurement values recorded at both ends 31a and 31b.

On the basis of the current measurement values from both ends 31a and 31b of the line 31, said values being available in both differential protection devices 32a and 32b, for each phase a differential current value can be formed in one or both differential protection devices 32a and/or 32b by means of the evaluation unit by vectorial addition of the current phasor measurement values and subsequent absolute value formation and can be compared with a threshold value.

In the case of a fault-free line 31, the current entering the line 31 for each phase is (almost) equal to the current emerging from the line 31, such that a phasor having the absolute value of approximately zero should result upon vectorial addition of the current phasor measurement values. In reality, however, the differential current value will usually assume a value not equal to zero, but it will lie below a predefined threshold value. This is attributable to a capacitive charging current on the monitored line, for example, which has the effect that even in the fault-free case the differential current value virtually never permanently assumes exactly the value zero. In addition, for example, transformer inaccuracies and measurement errors can also contribute to this effect. The predefined threshold value can be defined either statically or dynamically, for example in a manner adapted to the level of the respective phase currents.

The threshold value can be defined as a separate parameter. However, provision can also be made for checking whether a threshold value has been exceeded by evaluating the position of a measurement value pair containing the differential current value and an associated stabilization value in a tripping diagram. For this purpose, from mutually associated, i.e. simultaneously captured, current phasor measurement values, differential current values and associated stabilization values are formed and the position of the measurement value pair consisting of a differential current value and a stabilization value in the tripping diagram is checked. If the measurement value pair lies within a tripping range, a fault with regard to the monitored line is deduced and the fault signal is generated.

If the differential current value exceeds the predefined threshold value for a specific phase, then this indicates a fault with regard to the relevant phase of the line 31, which fault can be for example a short circuit with ground involvement or a two- or multi-pole short circuit, i.e. a short circuit between two or more phases of the primary component. For that phase for which the fault has been identified, the differential protection devices 32a and 32b generate a fault signal, thereby causing a tripping signal to be output via control lines 37a, 37b to phase-selectively switchable circuit breakers 38 and 39, respectively. The tripping signal causes the corresponding phase-related circuit breaker 38a, 38b, 38c and 39a, 39b, 39c, respectively, to open its switching contacts, such that the phase 33a, 33b, 33c affected by the fault is disconnected from the rest of the energy supply network.

If a short circuit with ground involvement is present on the phase 33b, for example, then the differential protection devices 32a and respectively 32b recognize this on the basis of a differential current value exceeding the respective threshold value and output tripping signals to the phase-related circuit breakers 38b and 39b, respectively, in order to disconnect the phase 33b of the line 31 from the energy supply network.

Although a three-phase line 31 having only two ends 31a and respectively 31b is shown in accordance with FIG. 3, the method according to the invention can also be used for arbitrary single-phase or multi-phase objects to be protected having two or more ends, for example electrical busbars having a plurality of branch junctions.

In order to be able to correctly determine the differential current value, it is necessary for the current phasor measurement values used for forming the differential current value actually to have been acquired simultaneously at the ends 31a, 31b of the line 31. Usually, however, particularly when the current phasor measurement values are transferred via a comparatively long communication path, a temporal delay is established, such that the locally acquired current phasor measurement value cannot readily be linked to a current phasor measurement value that has been acquired at a remote end and transferred. If current phasor measurement values that have not been acquired simultaneously are used, even in the case of a line that is actually free of faults differential current values can arise which exceed the threshold value and would thus result in a fault signal being output.

For the temporal assignment of the current phasor measurement values, the latter are therefore usually provided with a marking in the form of a time stamp indicating the point in time when they were acquired. By selecting those current phasor measurement values from different ends of the line which have a mutually matching time stamp, it is possible to ensure that the differential current value is calculated correctly. However, this procedure presupposes that the measuring units used for acquiring the current phasor measurement values each have local clocks or timers (CLK) which are synchronized with one another or at least have a known time offset. In order to achieve this, a continuous determination of a possible time offset between the timers (CLK) of the respective measuring units takes place, the time offset either being used for readjusting a timer (CLK) or being used by the evaluation unit of the differential protection devices for the temporal assignment of the current phasor measurement values. In the last-mentioned case, for the temporal assignment of the current phasor measurement values, the time offset determined has to be subtracted from the time stamp of the current phasor measurement value of that measuring unit which has the timer having an indicated time that is ahead in comparison with the other timer (CLK).

In order to determine the time offset between the timers (CLK) of the measuring units, it is possible to use a propagation time-based synchronization method, e.g. the so-called "ping-pong method". This involves measuring that time duration which is required to transfer a first message in one direction and then a second message in the other direction via the transfer path between the two measuring units. The messages transferred each have a time stamp indicating the point in time when they were sent. Moreover, the measuring units record the point in time when the respective message is received. On the basis of the time stamps, it is possible to determine the time duration for the pure transfer of the messages (without possible time delays between receiving the first message and sending the second message). The time duration determined is halved and yields the propagation time on the communication path for a message transferred in one transfer direction. On the basis of the time stamps transferred with the messages and also the points in time of reception and the propagation time now known, the measuring units can determine the time offset between the timers (CLK) of the measuring units. Further details concerning the ping-pong method can be found in U.S. Pat. No. 8,154,836 B2, cited in the introduction.

Besides or in addition to the propagation time-based synchronization method, the timers (CLK) can also be synchronized externally, for example by means of a GPS signal or a PTP method in accordance with IEEE 1588.

In the case of the protection system illustrated by way of example in FIG. 3, just a single object to be protected is monitored by the differential protection devices, such that a communication connection in the form of a single physical transfer path is sufficient for exchanging the current phasor measurement values between the differential protection devices 32a, 32b. For this purpose, each of the differential protection devices 32a, 32b is connected to the communication connection 16 via a physical interface.

As soon as the differential protection devices of the protection system are embodied for simultaneously monitoring a plurality of objects to be protected, besides alterations in terms of metrology and processing technology, it is also necessary to carry out adaptations with regard to communication. These are elucidated in more specific detail in FIG. 4.

Figure 4:
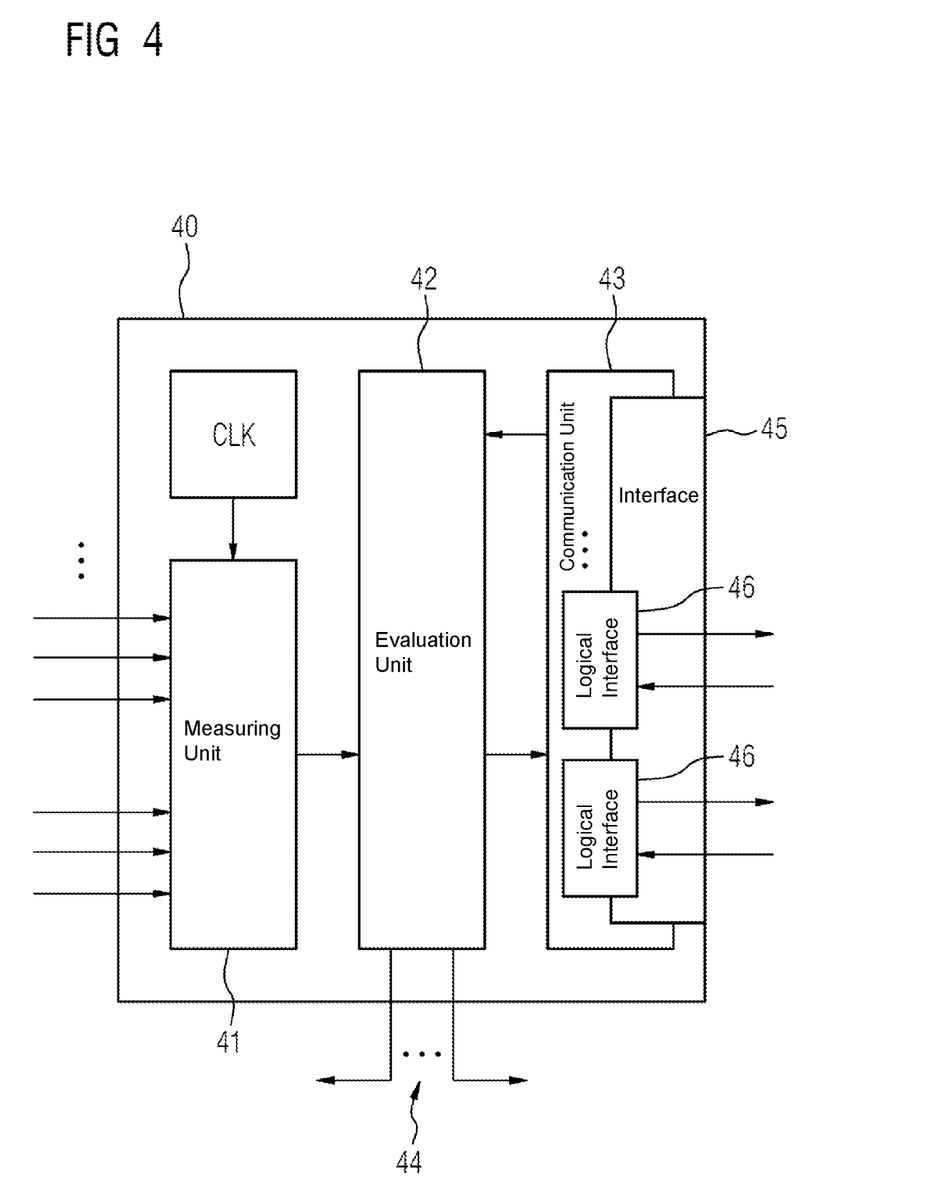
FIG. 4 is a diagrammatic block diagram showing a schematic view of a differential protection device for monitoring a plurality of objects to be protected.

In this respect, FIG. 4 shows an exemplary embodiment of a differential protection device 40 in a schematic view. The differential protection device 40 comprises a measuring unit 41, an evaluation unit 42 and a communication unit 43. Measurement signals indicating the current flowing at a respective end of an object to be protected are fed to the measuring unit 41 via external sensors (e.g. current transformers), which are not shown in FIG. 4. The signals can be current or charge signals. By means of the measuring unit, preprocessing of the measurement signals takes place, e.g. a form of filtering and A-D conversion to form measurement values. In addition, the measurement values can be time stamped on the basis of a time signal provided by a timer CLK. The measurement value acquisition described takes place for at least two objects to be protected, such that local measurement values are present for each object to be protected. Finally, the measurement values are fed to the evaluation unit 42.

The locally acquired measurement values are additionally transferred via the communication unit 43 to at least one differential protection device arranged at another end of the objects to be protected. Moreover, by means of the communication unit 43, time-stamped measurement values transmitted by the at least one other differential protection device are received, the measurement values indicating currents flowing at the other ends of the objects to be protected. These measurement values are likewise fed to the evaluation unit 42.

The evaluation unit 42 carries out the differential protection method described in the context of FIG. 3 for each of the objects to be protected that are monitored by the differential protection device 40, and in the process calculates corresponding differential values for each of the objects to be protected. If a fault is identified, then tripping signals are output via control outputs 44 to corresponding circuit breakers in order to switch off the current flow through the faulty object to be protected.

The communication unit 43 is embodied for exchanging the measurement values in such a way that the measurement values of all objects to be protected that are monitored by the differential protection device 40 can be transferred via a single physical interface 45, which can be e.g. a serial interface or an optical or electrical Ethernet interface. For this purpose, the physical interface implements a plurality of logical interfaces 46, the number of which corresponds to the number of monitored objects to be protected. The logical interfaces are embodied for embodying independent logical data connections to corresponding logical interfaces of a respective other differential protection device and have dedicated addresses (e.g. MAC addresses or logical device addresses) for this purpose. Via each of the logical interfaces, the differential protection device is thus connected to a respective dedicated logical transfer channel via which the measurement values acquired for the corresponding object to be protected are exchanged. For this purpose, data messages are in each case formed which are transmitted to the respective address of the logical interface of that differential protection device to which they are directed. Conversely, each logical interface receives data messages directed to their respective address.

The communication unit 43 can be embodied for example in the form of an FPGA or an ASIC. Such computing components with specialized hardware-based programming have a high computing power and can provide the necessary bandwidth for transferring the measurement values via a plurality of logical interfaces.

Figure 5:
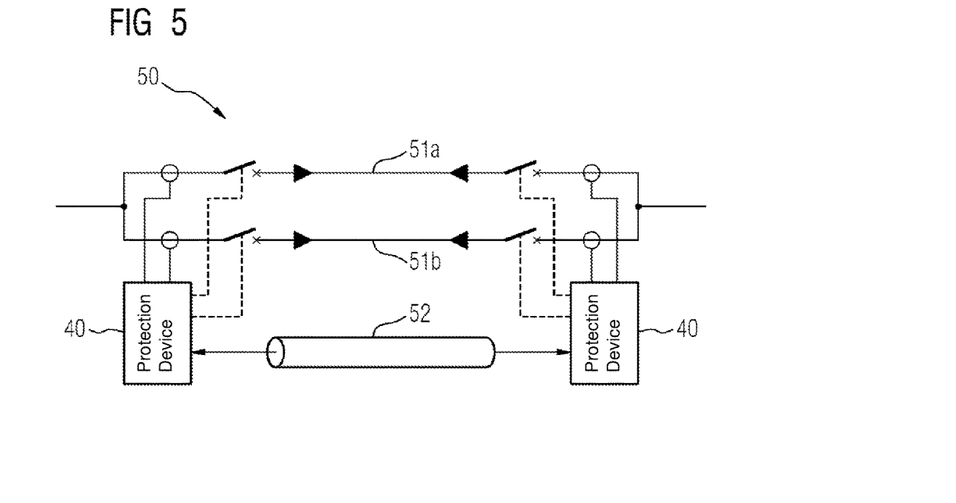
FIG. 5 is a diagrammatic block diagram showing an exemplary embodiment of a protection system with objects to be protected that are arranged in parallel.
Figure 6:
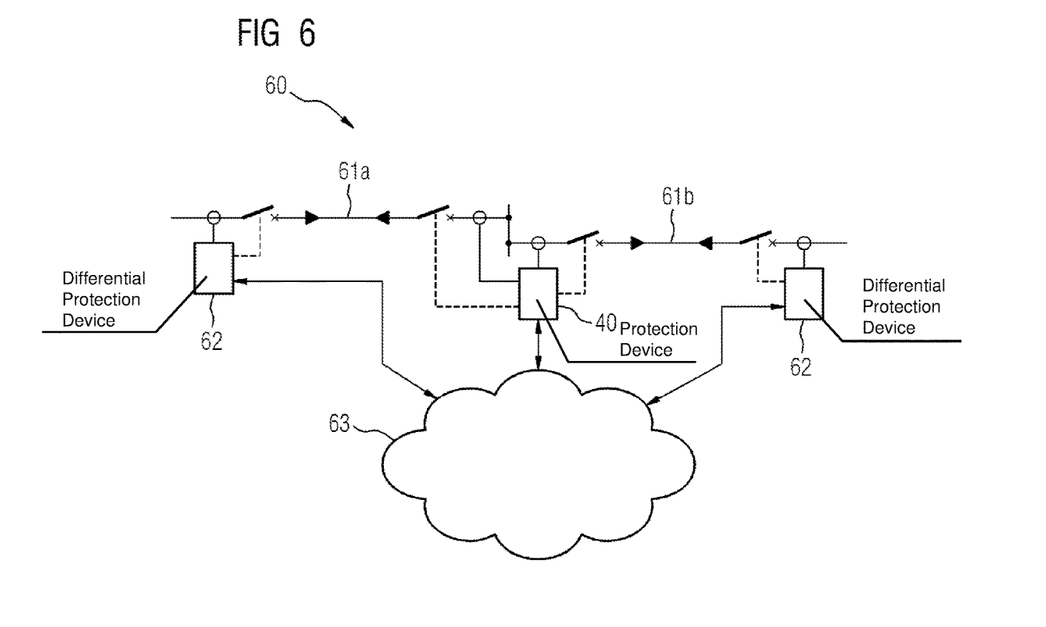
FIG. 6 is a diagrammatic block diagram showing an exemplary embodiment of a protection system with objects to be protected that are arranged in a mutually adjoining fashion.

FIGS. 5 and 6 illustrate exemplary topologies of protection systems for which the invention can advantageously be used.

FIG. 5 shows a protection system 50 with two objects to be protected 51a, 51b in the form of lines, the objects being arranged parallel to one another. A respective differential protection device 40 is arranged at the ends of the two objects to be protected 51*a*, 51*b*. These differential protection devices 40 are thus embodied in each case for monitoring two objects to be protected and each comprise a communication unit having in each case a single physical interface for transferring the measurement values. In the respective physical interface, in each case two logical interfaces are embodied, each of which respectively is assigned to one of the two objects to be protected and serves for transferring the measurement values in this regard. A single physical transfer path 52 is thus embodied, with two logical transfer channels passing via it.

FIG. 6, finally, shows a protection system 60 with two mutually adjoining objects to be protected 61*a*, 61*b* in the form of lines. The objects to be protected 61*a*, 61*b* are delimited at their ends in each case by differential protection devices, wherein that differential protection device 40 which is arranged at the location at which the objects to be protected 61*a*, 61*b* adjoin one another is correspondingly embodied for monitoring two objects to be protected. Differential protection devices 62 embodied only for monitoring a single object to be protected can be arranged at the other ends of the objects to be protected 61*a*, 61*b*. Of course, at these locations, it is also possible to arrange differential protection devices embodied for monitoring a plurality of objects to be protected, in order to be prepared possibly for future network extensions.

The differential protection device 40 contains a single physical interface for transferring the measurement values, the physical interface being connected to a physical transfer path 63, which can be embodied e.g. as a network or as a data bus. In the physical interface, two logical interfaces are embodied, each of which respectively is assigned to one of the two objects to be protected and serves for transferring the measurement values in this regard. Thus, in this exemplary embodiment, too, a single physical transfer path 63 is embodied, with two logical transfer channels passing via it, namely one channel each between the differential protection device 40 and each of the differential protection devices 62.

Besides the topologies shown by way of example in FIGS. 5 and 6, it is also possible, of course, to use other topologies in which individual or all differential protection devices serve for monitoring a plurality of objects to be protected.

For the configuration of the logical interfaces, provision can be made for the differential protection devices to carry out an automatic recognition of which other differential protection devices they are respectively connected to and which differential protection device is assigned to which object to be protected. For this purpose, identification information can be exchanged, for example, which firstly serves for identifying the respective differential protection device and secondly includes an indication about the respectively monitored object to be protected or the respectively monitored objects to be protected. Moreover, the identification information can include addresses of the logical interfaces assigned to the respective objects to be protected. With this information the respective differential protection devices can carry out the configuration of the respective logical interfaces. In particular, the addresses to which the measurement values acquired for a respective object to be protected are intended to be transmitted are defined during this configuration. The latter also involves defining to which object to be protected measurement values received via a specific logical interface should be assigned in order to carry out the differential protection method.

In this case, the configuration of the logical interfaces can also be carried out on the basis of configuration files embodied according to the standard IEC 61850. Such configuration files, such as e.g. an SCD or an ICD, usually indicate an assignment of device functions to individual objects to be protected and also the required addresses and identification information.

After the successful configuration of the logical interfaces, the necessary logical transfer channels via which the measurement values required for the monitoring are exchanged between the individual differential protection devices are established on the physical transfer paths.

Although the invention has been more specifically illustrated and described in detail above by means of preferred exemplary embodiments, the invention is not restricted by the examples disclosed and other variations can be derived therefrom by the person skilled in the art, without departing from the scope of protection of the patent claims that follow.

The invention claimed is:

1. A differential protection device for monitoring a first object to be protected in an electrical energy supply network, the differential protection device comprising:
   a measuring unit configured to acquire measurement values at one end of the first object to be protected, the measurement values indicating a current flowing at the one end;
   a communication unit configured to exchange measurement values with a second differential protection device disposed at another end of the first object to be protected, wherein said communication unit having a physical interface for transmitting and receiving the measurement values;
   an evaluation unit configured to form a differential value with mutually assigned measurement values from both ends of the first object to be protected and to generate a fault signal indicating a fault with regard to the first object to be protected if the differential value exceeds a predefined threshold value;
   the differential protection device being configured to monitor at least one further object to be protected at a same time as the first object to be protected and to exchange respective further measurement values with regard to each further object to be protected, wherein all the measurement values are transmitted and received via a same physical interface; and
   the differential protection device being further configured to automatically recognize other differential protection devices connected to it via a communication connection and to assign a respective associated differential protection device to each monitored object to be protected.

2. The differential protection device according to claim 1, wherein said physical interface has at least two logical interfaces, wherein for each monitored object to be protected a dedicated logical interface from said at least two logical interfaces is provided, via which the measurement values related to a respective monitored object to be protected are exchanged.

3. The differential protection device according to claim 1, wherein said measuring unit acquires the measurement values in a form of current phasors indicating an amplitude and phase angle of currents flowing at the end of the first object to be protected.

4. The differential protection device according to claim 1, wherein said measuring unit has a local timer and assigns to the measurement values in each case a time stamp indicating a point in time when they were acquired.

5. The differential protection device according to claim 1, wherein the differential protection device is configured, when a connection to another differential protection device is established, to exchange identification data enabling an assignment of a respective differential protection device to a respective monitored object to be protected.

6. The differential protection device according to claim 1, wherein the differential protection device is configured to perform an automatic recognition and/or assignment of another differential protection device on a basis of a configuration file formed in accordance with standard international Electrotechnical Commission (EC) 61850.

7. A protection system for monitoring at least two objects to be protected in an energy supply network, the protection system comprising:
  at least two differential protection devices, of which at least one of said differential protection devices is embodied according to claim 1.

8. The protection system according to claim 7, wherein the protection system is embodied for monitoring the at least two objects to be protected which are disposed parallel to one another, wherein said at least one differential protection device is disposed at respective ends of the two objects to be protected.

9. The protection system according to claim 7, wherein the protection system is embodied for monitoring the at least two objects to be protected which adjoin one another, wherein said at least one differential protection device is disposed at those ends of the at least two objects being mutually adjoining objects to be protected.

* * * * *